United States Patent [19]
Pfund

[11] 3,935,828
[45] Feb. 3, 1976

[54] METHOD AND APPARATUS FOR OBTAINING MAXIMUM SAIL BOAT VELOCITY

[76] Inventor: Charles E. Pfund, 16 Balcarres Road, West Newton, Mass. 02165

[22] Filed: Apr. 8, 1974

[21] Appl. No.: 458,643

Related U.S. Application Data

[63] Continuation-in-part of Ser. No. 243,214, April 12, 1972, Pat. No. 3,802,372.

[52] U.S. Cl............ 114/102; 73/178 R; 114/144 E
[51] Int. Cl.$^2$........ 114 39; B63H 9/04; G01C 21/12
[58] Field of Search........ 114/144 R, 114 C, 114 E, 114/39, 102, 105; 318/588; 73/178 R, 180, 181, 186, 187, 189, 182, 144

[56] References Cited
UNITED STATES PATENTS

| | | |
|---|---|---|
| 3,304,778 | 2/1967 | Stuart ............................. 73/189 |
| 3,398,575 | 8/1968 | Saxl ................................ 73/144 |
| 3,531,988 | 10/1970 | Knotmeter ...................... 73/187 |
| 3,618,379 | 11/1971 | Lipton ............................ 73/144 |

Primary Examiner—Trygve M. Blix
Assistant Examiner—Sherman D. Basinger
Attorney, Agent, or Firm—Charles E. Pfund, Esq.

[57] ABSTRACT

In a sailboat, signals representing relative wind speed and slot wind speed are differentially compared to obtain a signal that represents the increase in wind speed in the slot over the relative wind speed approximately independent of incremental changes in relative wind speed approximately independent of incremental changes in relative wind speed. By observing the differential quantity upon relative adjustment of the sails, a sail setting can be selected to give maximum slot effectiveness. An instantaneously responsive thrust indicator is provided as a guide to overall sail trim effectiveness for maximum driving force on the hull.

1 Claim, 5 Drawing Figures

U.S. Patent  February 3, 1976  3,935,828
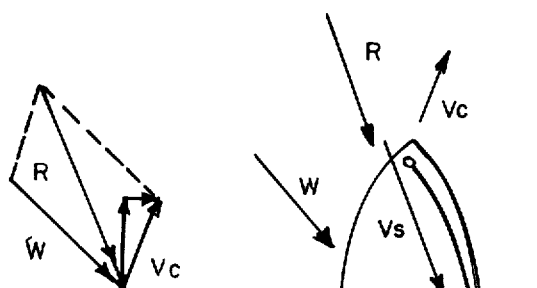
FIG.1
FIG.2
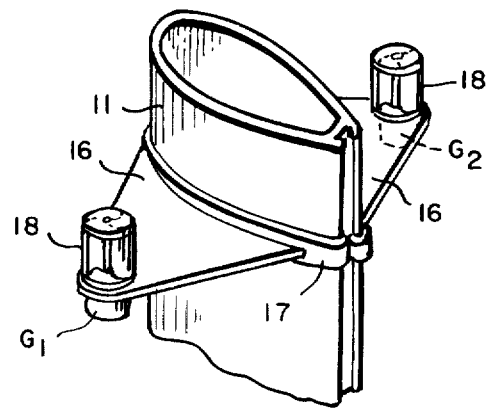
FIG.3
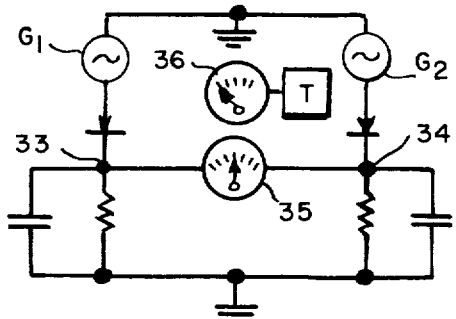
FIG.4
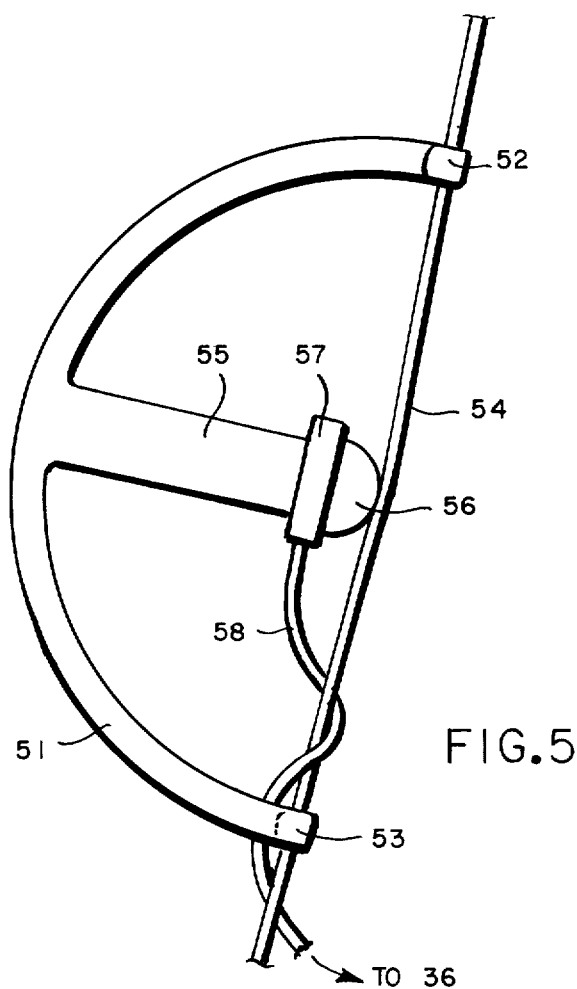
FIG.5

METHOD AND APPARATUS FOR OBTAINING MAXIMUM SAIL BOAT VELOCITY

RELATED APPLICATION

This application is a continuation-in-part of copending application Ser. No. 243,214, filed Apr. 12, 1972, now U.S. Pat. No. 3,802,372.

BACKGROUND OF THE INVENTION

The adjustment of the sails on a modern sailboat having a mainsail and overlapping jib or genoa foresail to obtain maximum forward hull speed for the boat involves taking into consideration a large number of interrelated variables, many of which are constantly subject to change as the sailboat is underway. The selection of sail settings for maximum hull speed when the sailboat is on a windward tack is a matter requiring a high degree of skill from the helmsman and crew particularly if maximum performance on course is required as in competitive racing where the windward leg of the contest is generally conceded to be the most critical phase of the competition.

Generally, the helmsman relies primarily upon his knowledge and experience to adjust the mainsail and jib in relation to the heading of the craft with respect to the prevailing wind. As a quantitative indication various forms of relative wind or through the water hull speed indicators may be employed. One of the difficulties of the helmsman's self-evaluation of his performance from moment to moment as the craft progresses on the selected course is that the wind, water, heading and sail setting variables are all generally interrelated and subject to independent variation throughout the voyage. On the other hand, the quantitative indication of hull speed by means of some sensor on the hull that is in contact with the water necessarily involves a time lag to indicate the result of a given adjustment in any of the variables available to the helmsman for adjustment such as sail setting since the increment of force resulting from a change in setting requires a certain amount of time to alter the momentum and thus the speed of the sailboat. Where relative wind speed indications are used as a guide, these readings, of course, are directly influenced by changes in both the wind speed and wind direction as well as the heading direction of the craft with respect to a constant wind velocity. There is thus in the prior art no rapidly responsive instrument for indicating factors directly related to the driving force which determines the forward speed of the boat and which is relatively independent of changes in wind and heading variables.

BRIEF SUMMARY OF THE INVENTION

In accordance with the present invention the relative wind is sensed and the wind speed in the slot formed between the mainsail and jib is also sensed to obtain two variables, one of which is related by a factor to the other. Thus the slot wind speed is generally equal to the relative wind speed times some factor $n$, where $n$ is the efficiency of the slot configuration to accelerate the wind and produce a higher velocity in the slot than the wind moving outside the slot.

By differentially comparing these two quantities particularly by subtracting the relative wind speed from the slot wind speed a quantity is obtained directly related to the factor n and if this factor is maximized the driving force on the boat due to the slot is correspondingly a maximum. An additional thrust sensor is used to sense and indicate overall driving force.

It is, accordingly, a principal object of the present invention to provide a method for indicating when the adjustment of the sails of a sailboat have been set to maximize slot wind speed between the sails in conjunction with an instantaneous thrust indication thereby providing criteria for maximizing the driving force on the hull.

BRIEF DESCRIPTION OF THE DRAWINGS

FIG. 1 is a vector diagram showing the relation between various vectors involved in a sailboat sailing on the wind.

FIG. 2 is a top plan view of a Marconi rig sailboat showing the vectors of FIG. 1 and the additional vector representing slot wind velocity.

FIG. 3 is a fragmentary view of a sailboat mast showing wind sensors attached in accordance with the present invention.

FIG. 4 is a schematic circuit diagram of one form of indicator circuit in accordance with the invention.

FIG. 5 is an elevation view of a tension sensor attached to the back stay.

DESCRIPTION OF THE PREFERRED EMBODIMENT

Referring to FIG. 1, a sailboat moving with velocity $V_c$ relative to wind vector W is subject to the force of the relative wind R which acts on the sails of the boat. The vector $V_c$ can be resolved into orthogonal components along the heading and transversely thereto representing the side slip of the craft as it progresses in the direction $V_c$.

In FIG. 2, a sailboat having a Marconi rig is shown in top plan view as comprising a hull 10, a mast 11, boom 12, mainsail 13, and jib or genoa 14. The sailboard 10 moves in the direction $V_c$ which is different than its heading direction by the amount of side slip as indicated in FIG. 1 with the angle between $V_c$ and the wind direction W generally being approximately 45° when beating to windward. As a result of the velocity of the sailboat 10, the relative wind acting on the sails corresponds to the vector R. The presence of a foresail produces a slot effect and the wind velocity is modified in the volume between the convex surface of the mainsail 13 and the concave surface of the jib 14. In this volume the wind will be accelerated to move at some high velocity $V_s$ as indicated in FIG. 2. Ideally the flow is laminar thus the velocity $V_s$ varies from point to point both in direction and magnitude.

As shown in FIG. 2, a pair of wind sensors generally indicated at 15 attached symmetrically on opposite sides of the mast 11 will be in positions where one of the sensors will be subject to the relative wind and the other sensor will be well positioned within the slot between the sails 13 and 14 to measure the magnitude of the vector $V_s$ at the position in which it is located. In FIG. 2 the craft is shown being on port tack and the left or port sensor will measure the relative wind while the right or starboard sensor will measure the slot wind velocity. It is apparent for starboard tack the quantities measured by the two sensors are interchanged.

Referring now to FIG. 3, a more detailed showing of the placement of the symmetrical wind sensors can be seen. On the mast 11 a pair of triangular shaped rigid plates 16 are mounted by means of a tension band 17. The base of the triangular plate 16 may be contoured to fit the curvature of the mast and at the apex of the triangle a pair of wind rotors 18 are symmetrically mounted. The rotors 18 respectively drive tachometer generators $G_1$ and $G_2$ which generators produce an electric signal having a characteristic such as voltage or frequency that varies directly with the speed of the rotors 18 and thus directly with wind speed to which the respective rotors 18 are responsive. It should be noted that the present invention is not limited to wind rotor and tachometer generator wind speed sensors, but any suitable devices capable of sensing wind speed and producing signals representative thereof may be employed in the approximate locations indicated in FIG. 3. Thus Pitot tubes and various other wind pressure sensors may be employed and in such embodiments the signals need not necessarily be electric since the hydraulic equivalent of the sensor and circuit arrangements here disclosed as electrical may readily be used to practice the invention.

Referring to FIG. 4, a circuit in accordance with the invention is shown connected to the tachometers $G_1$ and $G_2$. These generators may generate a voltage, the magnitude of which is directly proportional to wind speed. Alternatively, some other characteristic of the electrical signal generated may be proportional to wind speed such as frequency, for example. In any event, the generated signal magnitude is converted at points 33 and 34 into DC voltages which are the analogs of the wind speed at the sensors $G_1$ and $G_2$. The voltages at points 33 and 34 are differentially compared or subtracted by a zero center meter 35 connected to points 33 and 34. With the circuit indicated, the meter 35 will read or indicate a quantity equal to the difference in the wind speed signals obtained from generators $G_1$ and $G_2$. Depending upon whether the craft is on port or starboard tack, the indicator 35 will deflect on opposite sides of its zero center position. By adjusting the setting of the jib 14, the slot wind speed can be maximized by the indication of maximum deflection of the meter 35. To obtain the optimum setting of both the mainsail and jib, an indicator 36 which is related to instantaneous boat thrust may be provided. The indicator 36 may be any form of device responsive to a given sensing device T and for example may be a rigging wire or line tension sensor. By making a succession of adjustments of the position of the boom 12 to set the mainsail and for each setting of the mainsail adjusting the jib 14 to obtain a maximum on meter 35, it will be possible to observe which setting of the mainsail produces maximum boat thrust as indicated on the indicator 36. When the indicator 36 is maximized and the indicator 35 also indicates a maximum the optimum setting of the sails for the given condition exists.

The total forward thrust vector on a sailboat is a complex resultant of many variables. The driving force of the sails is applied to the hull primarily by the tension in the rigging, both standing and running. If fully instrumented, the various tension forces would be sensed in magnitude and each stay or sheet tension would be resolved in a coordinate system which would permit summing the horizontal vectors to obtain the resultant forward thrust. Such a system would generally be quite complex and expensive. An approximate indicator of forward thrust is the back stay tension which can be measured as a scalar quantity since the back stay angle relative to the hull does not vary over a wide range. Thus an indication of back stay tension can be used, to a first approximation, as directly related to forward thrust.

FIG. 5 shows a simple arrangement for sensing back stay tension. Many other forms of sensors can be used such as strain gauges installed at the deck or masthead fittings for the various stays but the arrangement shown in FIG. 5 can be readily attached and provides a simple arrangement.

FIG. 5 shows a form of tension sensor which has a relatively rigid bow frame 51 with end fittings adapted to clip on and bear against the flexible line in which tension is to be measured. In FIG. 5 the clip-on fittings 52, 53 are shown attached to a backstay 54, only a portion of which is shown. The bow 51 is formed with an integral radial extension 55 which extends toward and has an end fitting 56 which bears on the stay 54. The effective overall length of extension 55 and its end fitting 56 is greater than the radius of bow 51 and it thus extends beyond a straight line drawn between end clips 52, 53. When attached the device thus slightly deflects the backstay 54 and the tension in the backstay 54 produces a force of compression in the member 55. An interposed strain gauge 57 senses this compressive force and a signal on lead wire 58 can be connected to indicating meter 36 (FIG. 3) to provide an indication related to forward thrust. By observing meter 36 for a maximum while adjustments are made the quantitative effect of such adjustments can be interpreted. Since the response of the strain gauge is practically instantaneous, this indication does not involve delay as is inherent in observing change in hull speed.

I claim:

1. In a sailboat the method of adjusting a set of sails forming a slot comprising the steps of:

sensing the relative wind speed outside said slot;

sensing the wind speed in said slot;

differentially comparing the two sensed values of wind speed;

indicating the magnitude of the difference between said values approximately independent of incremental changes in relative wind velocity;

relatively adjusting the sails of said set for varying said slot to maximize said magnitude as an indication of maximum difference between said two sensed values of wind speed corresponding to maximum slot wind speed;

repeating the relative adjustment of said sails for successive settings of one of said sails;

indicating a quantity substantially instantaneously related to boat thrust; and selecting the setting of said one sail which makes said quantity related to boat thrust a maximum in conjunction with said indication of maximum difference between said two sensed values of wind speed.

* * * * *